(12) United States Patent
Brum

(10) Patent No.: US 7,648,667 B2
(45) Date of Patent: Jan. 19, 2010

(54) HIGH SPEED GOLF BALL CORE MOLDING

(75) Inventor: William Brum, Raynham, MA (US)

(73) Assignee: Acushnet Company, Fairhaven, MA (US)

( * ) Notice: Subject to any disclaimer, the term of this patent is extended or adjusted under 35 U.S.C. 154(b) by 171 days.

(21) Appl. No.: 11/856,127

(22) Filed: Sep. 17, 2007

(65) Prior Publication Data

US 2009/0072445 A1    Mar. 19, 2009

(51) Int. Cl.
*B29C 51/08* (2006.01)
(52) U.S. Cl. .............. 264/322; 264/297.6; 264/320
(58) Field of Classification Search ............ 264/297.3, 264/297.6, 322, 320; 425/116, 149, 233, 425/327, 395, 408
See application file for complete search history.

(56) References Cited

U.S. PATENT DOCUMENTS

| | | | | |
|---|---|---|---|---|
| 2,333,833 | A * | 11/1943 | Tryfus | .......................... 264/19 |
| 4,558,499 | A | 12/1985 | Brown | |
| 5,795,529 | A | 8/1998 | Reid, Jr. | |
| 6,120,390 | A | 9/2000 | Dalton | |
| 6,239,222 | B1 | 5/2001 | Nesbitt | |
| 6,258,302 | B1 | 7/2001 | Nesbitt | |
| 6,277,920 | B1 | 8/2001 | Nesbitt | |
| 6,503,073 | B2 * | 1/2003 | Marshall et al. | .............. 425/116 |
| 6,582,215 | B2 | 6/2003 | Cloutier | |
| 6,769,900 | B2 | 8/2004 | Murphy et al. | |
| 6,776,942 | B2 | 8/2004 | Kim | |
| 6,817,853 | B2 | 11/2004 | Simonds et al. | |
| 6,892,560 | B2 | 5/2005 | Hiramatsu et al. | |
| 6,905,647 | B2 | 6/2005 | Endo et al. | |
| 7,001,545 | B2 | 2/2006 | Okado et al. | |
| 2003/0045376 | A1 * | 3/2003 | Dalton | ....................... 473/367 |
| 2006/0022364 | A1 * | 2/2006 | Scolamiero et al. | ......... 264/40.4 |
| 2009/0061043 | A1 * | 3/2009 | Fisch et al. | .................. 425/577 |

* cited by examiner

*Primary Examiner*—Joseph S Del Sole
*Assistant Examiner*—James Sanders
(74) *Attorney, Agent, or Firm*—D. Michael Burns

(57) ABSTRACT

A method of molding a golf ball core utilizing a single cavity mold that moves on a continuous conveyor system wherein heated preps are automatically and individually taken directly from the extruder and robotically placed into a bottom mold half that is integral with and moves along a conveyor at a speed consistent with the output from the extruder. This eliminates the prep's inefficient loss of heat during storage that is associated with the batch process. The method provides preheating each top and bottom mold half in separate conveyor ovens to about 350° F. prior to the prep being loaded into the bottom mold half. After the prep is loaded, the top and bottom mold halves are assembled to create the single cavity mold. The single cavity mold compresses the prep into a spherical core shape by utilizing spring force and retainer plates to exert about 384 lbs of force. The core is then moved by conveyor into a convection oven wherein the core is cured to a temperature of about 350° F. The cores are then robotically removed from the mold and transferred to a site wherein an intermediate or cover layer is placed over it.

11 Claims, 4 Drawing Sheets

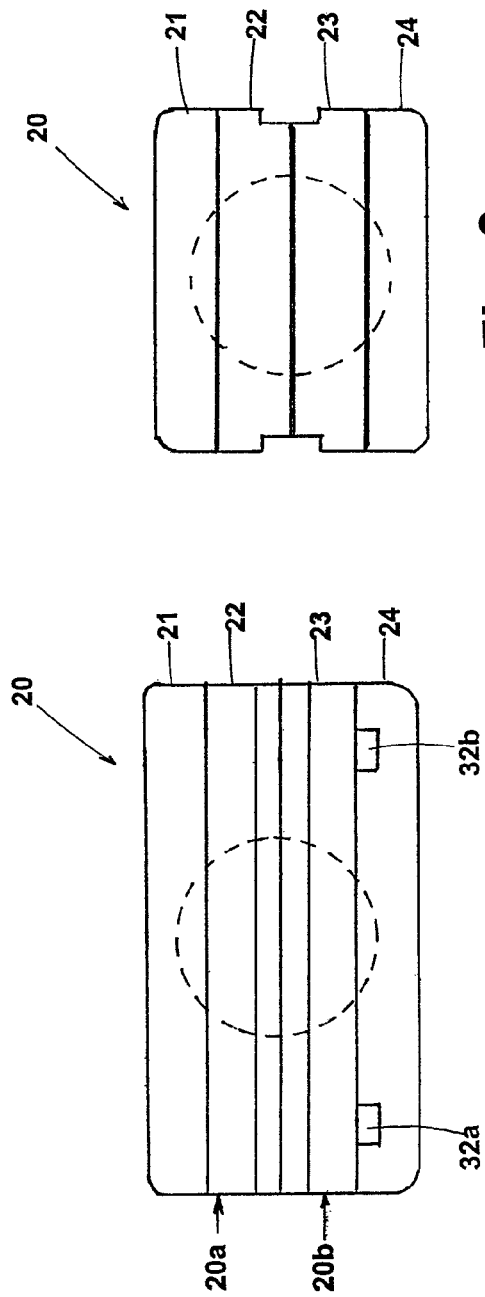
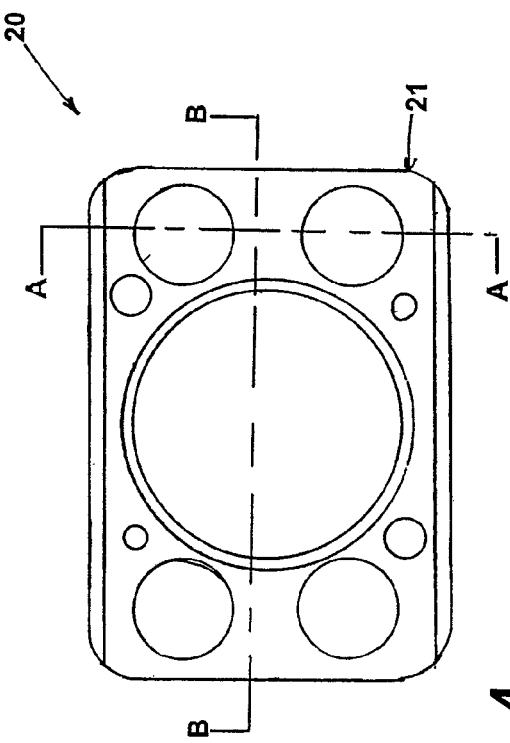

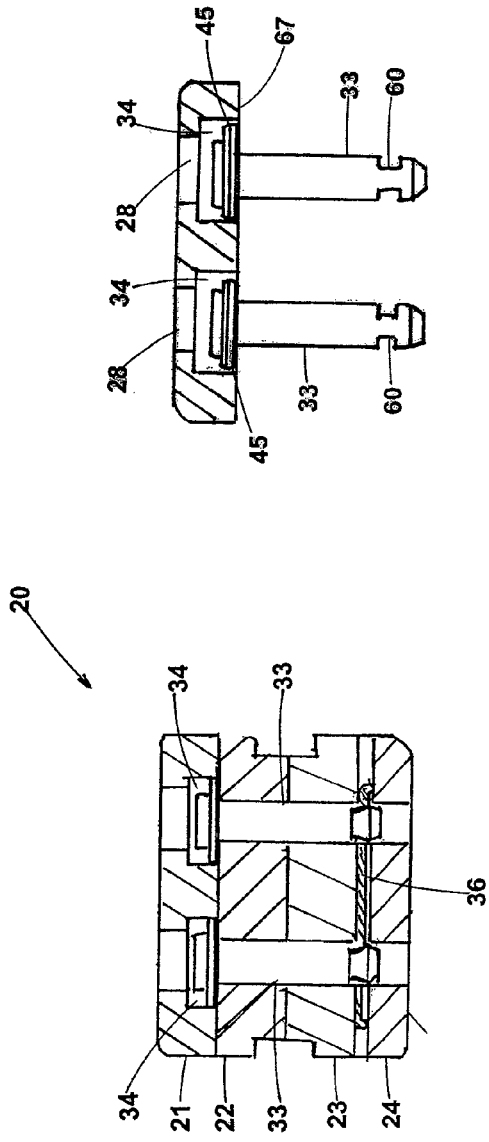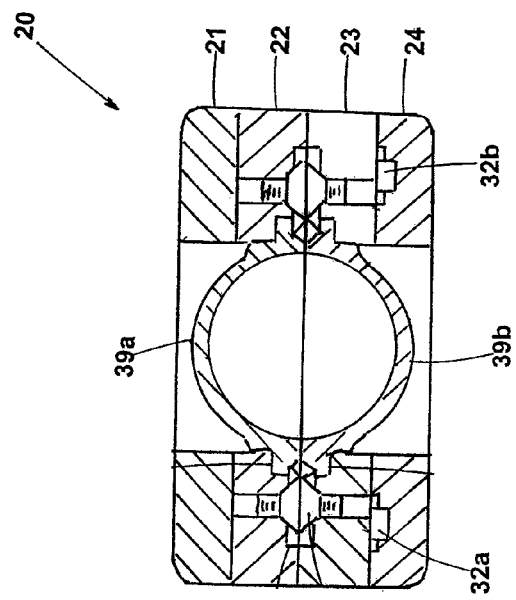

HIGH SPEED GOLF BALL CORE MOLDING

FIELD OF THE INVENTION

The invention relates to the molding of golf ball cores. More particularly, the invention relates to a continuous motion conveyor process of producing golf ball cores.

BACKGROUND OF THE INVENTION

Regardless of the form of the ball, players generally seek a golf ball construction that has particular play characteristics of velocity and spin, which match their swing style and club preference. It is well know in the golf ball industry that both initial ball velocity and spin have both been determined to be substantially dependent on the compression of the core. Typically the optimal level of cross-linking of the core material is predetermined and adjusted by the level of cross-linking agent to arrive at the desired core compression. Once players select a ball construction, they want consistent play characteristics between individual balls. Thus, to maintain consistent play performance between individual balls of a particular construction, manufacturers must produce golf balls with very consistent level of core manufacture.

Golf ball cores are typically formed within a compression type mold, which is heated to accelerate the core stock cross-linking reaction. The magnitude of temperature of the mold affects the time rate of cross-linking of the core stock and therefore will affect the length of time the stock must reside in the mold (or cure time) to achieve complete or optimal level of cross-linking. The mold is typically comprised of multiple cavities to facilitate high volume manufacturing and is placed into the mold press in batch quantities. Cavity temperature and compression will vary in different locations within the core mold, for example cavity locations along the outside perimeter will be cooler than the cavity locations in the inner regions of the mold. Therefore, in order to achieve complete cross-linking for all cores in all cavity locations, the cure time must be adjusted for the coolest regions that will have the lowest rate of reaction of the core stock.

Typically, core material is heated and extruded to form an elongated slug which is cut into desired lengths of cylindrical preps and loaded into jigs. A jig allows large numbers of preps to be held in the position and orientation needed in order to be placed properly in a mold, wherein they correspond to the multiple cavities of a mold platen.

Inefficiency, particularly as to loss of heat, is a major drawback of conventional golf ball core forming techniques, in that the preps come from the extruder in a heated form and cool during storage. Another inherent problem is that human errors result in misaligned preps which in turn results in defective cores. In addition, the proximity of human operators to the mold press for prep loading and core unloading limits the temperature of the molds for operator safety.

One disadvantage of the process described above is that the procedure of loading the preps into the jig, such that all the preps are oriented properly, is a time consuming manual process. On occasion, this manual process can result in improper loading of a prep, which can lead to the mold defects described above. In addition, the preps can lose their proper alignment for a number of other reasons. Once loaded, for example, the mold may be moved or jarred so that preps may move before the mold is closed. Removal of the jig also may cause preps to become misaligned.

There is a need to manufacture cores more efficiently, conserving energy costs, increasing production speeds, reducing space requirements, improving quality control, reducing ergonomic issues, and generally making a better core at a lower cost. The present invention provides such a method of making cores.

SUMMARY OF THE INVENTION

The present invention provides for a method of molding a golf ball core wherein the traditional batch process is eliminated along with the ergonomic problems associated with it. The present invention employs a continuous running conveyor system wherein the heated preps are each automatically and individually taken directly from the extruder and robotically placed into a bottom mold half that moves along a conveyor at a speed consistent with the output from the extruder. This eliminates the prep's inefficient loss of heat during storage that is associated with the batch process.

The present invention provides for preheating each top and bottom mold half in separate conveyor ovens to about 350° F. prior to the prep being loaded into the bottom mold half. After the prep is loaded, the top and bottom mold halves are assembled to create a single cavity mold. The single cavity mold compresses the prep into a spherical core shape by utilizing spring force and retainer plates to exert about 384 lbs of force. The core is then moved by conveyor into a convection oven wherein the core is cured to a temperature of about 350° F. The cores are then robotically removed from the mold and transferred to a site wherein an intermediate or cover layer is placed over it.

The present invention provides a method of conveyor speed of about 200 preps per minute which is the speed of the extruder. The extruder prepares the preps by mixing thermoset polybutadiene, a trans-polyisoprene and a modified, nonionic polyolefin, compatible with thermoset rubber materials.

BRIEF DESCRIPTION OF DRAWINGS

FIG. 2 is a front elevational view of a single cavity mold.

FIG. 3 is a side elevational view of the single cavity mold thereof.

FIG. 4 is a top plan view of the single cavity mold thereof.

FIG. 5 is a cross-section side view taken along line A-A of FIG. 4.

FIG. 6 is a cross-section side view of the top mold half backing plate taken along line A-A of FIG. 4

FIG. 7 is a cross-section front view taken along line B-B of FIG. 4.

DETAILED DESCRIPTION OF THE INVENTION

Prior art molding of cores requires significant capital machinery and services. In addition to the process extruder, jig loading automation, jig trucks, jigs and heavy duty hydraulic ram core molding presses are required. Additionally, the ergonomic factors created by the operation are a significant source of concern due to weight and repetitive motion injury. Other issues relate to material handling difficulties associated with preps and molded cores creating slip and fall hazards in addition to lost product and efficiency. The large cavity format contributes towards ergonomic issues related to weight and reach. The jig loading of as many as 196 preps and removal of 196 molded cores is a constraint to any improvement of the operation. Also, many issues are created as flash and cores break away from the matrix forcing the operator to remove individual pieces from the mold. Additionally the "book mold" concept limits access to prep and cores. Lastly, large format tooling requires significant molding pressure to achieve the required unit pressure on each cavity. Therefore, it has been necessary to utilize large ram hydraulic presses to meet requirements.

Figure 1:
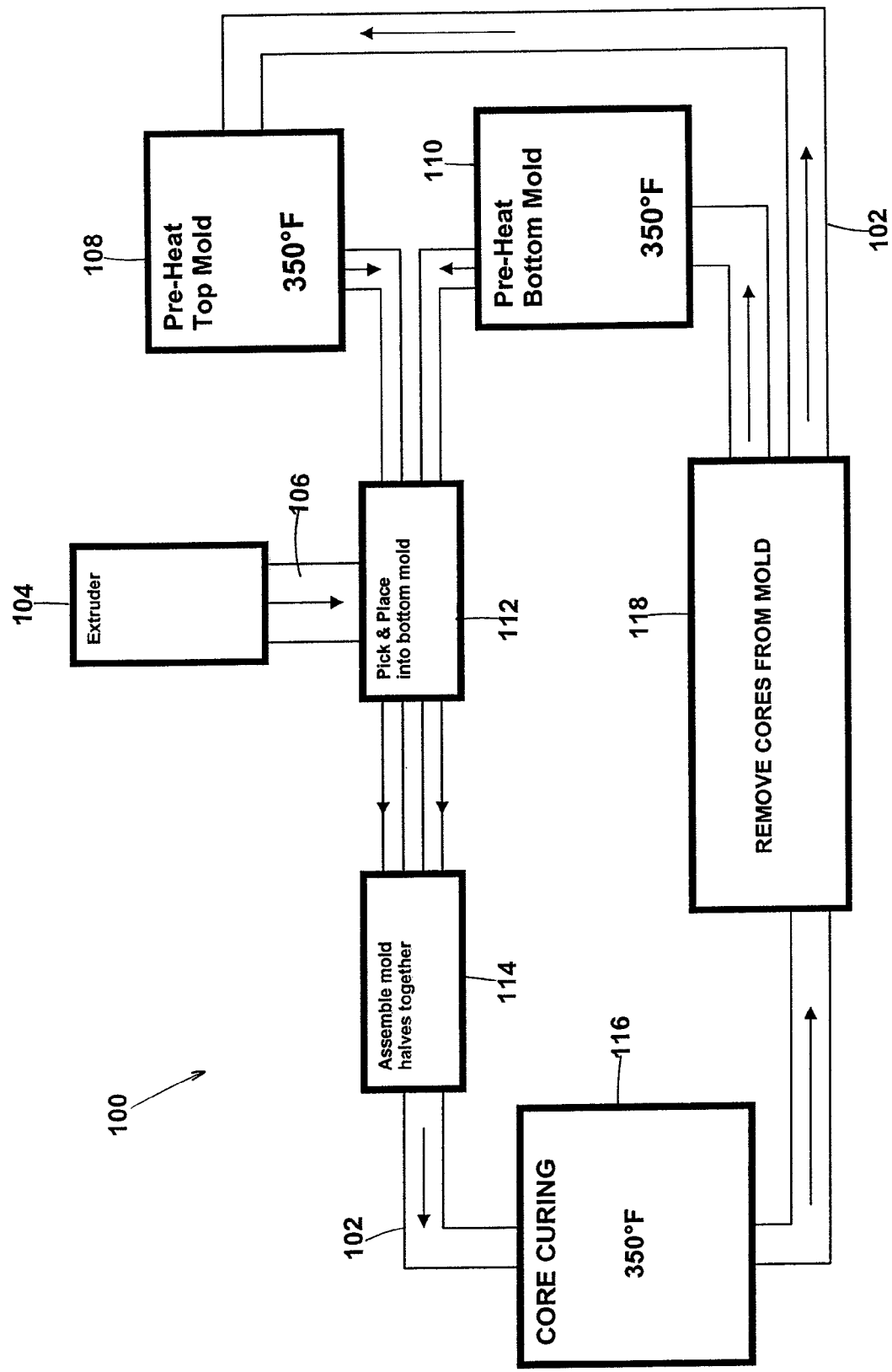
FIG. 1 is a top plan view of a schematic of the high speed core molding process according to the invention.

The present invention employs a method 100, as depicted in FIG. 1 which eliminates the traditional batch process and the associated ergonomic problems. The method 100 employs a continuous conveyor system 102 wherein a screw type extruder 104 produces heated preps 106 that are automatically and individually taken from the extruder 104 and robotically placed into bottom mold halves 20b affixed on the conveyor 102 which moves at a rate to accommodate about 200 preps per minute. The extruder 104 feeds the preps into plastic carriers in a singular fashion and they are indexed to a prescribed "pick and place" station 112 on the conveyor. The hot preps are then individually picked from the carriers and placed directly into a bottom mold half 20b. This eliminates any inefficient loss of heat that happens when the preps are placed into storage, or allowed to cool during a time gap between extruder and press. These single cavity molds 20 are described in FIGS. 2-10, and in greater detail in the Applicant's co-pending U.S. application Ser. No. 11/678,787, filed on Feb. 26, 2007, which is incorporated in its entirety herein.

For the present invention, the single cavity molds 20 do not include a dimple pattern for the interior surface of the mold as in the "787 application. Upon the preps being loaded into the bottom mold halves 20b, they are then transported to an assembly station 114, wherein the top mold halves 20a are clamped onto the loaded bottom mold halves 20b to create a single cavity mold 20. The single cavity mold 20 compresses the prep into a spherical core shape by utilizing spring force and retainer plates to exert about 384 lbs of force. The assembled single cavity molds 20 then travel on the conveyor through a "conveyor" convection oven 116 wherein the cure is completed at a temperature of about 350° F. Upon completion of the cure, the molds 20 travel to a disassembly station 118 upon which the mold halves 20a, 20b are therein separated, product is robotically removed and flash removed all in the automated fashion. The mold halves 20a and 20b then travel to a preheated staging station 110, wherein they are heated to about 350° F. in separate convection ovens, a bottom preheat oven 110 for the bottom mold halves and a top preheat oven 108 for the top mold halves 108. They are then sent to the "pick and place" station 112 to continue the process ad infinitum.

As previously stated, with the direct transfer of heated preps 106 from the extruder 104 to the mold, the present invention eliminates the need for bulk storage of the preps, thus conserving internal heat obtained in the extrusion, and eliminating the batch method for compression molding. Moreover, the invention eliminates misalignment of the preps by robotically transferring the preps from the extruder directly to a single cavity core molding press, thereby reducing rejects and improving overall quality of the cores. Operator injury is avoided by the elimination of jigs and the ergonomic issues associated with the labor of loading and unloading jigs. The use of a hydraulic ram press is eliminated, and the present invention utilizes extruder process heat in the preps to accelerate the core molding process. The replacement of the batch process multiple cavity mold with single cavity molds that are in motion with a conveyor insures more equalized pressure and more efficient use of heat. The present invention uses low cost steam heating ovens to cure product, since a temperature of 350° F. is sufficient and can be controlled very precisely in a single cavity mold in lieu of the heat instability in a mold containing 196 preps.

As described in FIGS. 2-10, the single cavity mold 20 comprises a pair of mold halves, a top 20a and a bottom 20b, with each mold half having backing plates 21 and 24, and mold frames 22 and 23 respectively. The top mold half houses an upper hemispherical cavity mold 39a while the bottom mold half houses a lower hemispherical cavity 39b. Each mold provides for compression molding using only the single cavity and without the need of bolts to secure the mold halves together. The mold 20 utilizes a plurality of clamping pins 33, each pin having its top portion reciprocally disposed in a recess 34 of the backing plate 21 of the top mold 20a. Double spring Belleville washers 45 are integral to the top portion of each clamping pin 33 and when an outside force is applied, the washers 45 are compressed placing the device into a controlled state of tension. To maintain the compressive force for the duration of the molding cycle, the clamping pins 33, which have cutout sections 60 in the lower area, are locked in the tension state by a pair of sliding retainers 36 that are positioned in channels 32a and 32b of the lower backing plate. Each retainer 36 comprises a pair of engagement loops 57 of a size and shape for locking with the cutout sections 60 of the pins 33. When an outside source provides a horizontal force to the retainers 36, the engagement loops 57 of the retainers slide freely within the channels 32a and 32b and into contact with the cutout sections 60 of the clamping pins 33 which have been lowered into position by the vertical force upon them, wherein the clamping pins 33 are locked in a tensioned state for the duration of the molding cycle. To release the mold-halves, a subsequent vertical force is applied to the top of the clamping pins 33 wherein they are moved out of the locking relationship with the engagement loops 57, and with a coordinating horizontal force applied, the retainers 36 are moved away from the pins 33, releasing the compressive force on the mold halves 20a and 20b. Not only are bolts eliminated, but also any subsequent uneven forces applied throughout the mold. The uneven application of force is a main cause of uneven thickness of cover material, especially in the application of polyurethane material.

Figure 8:
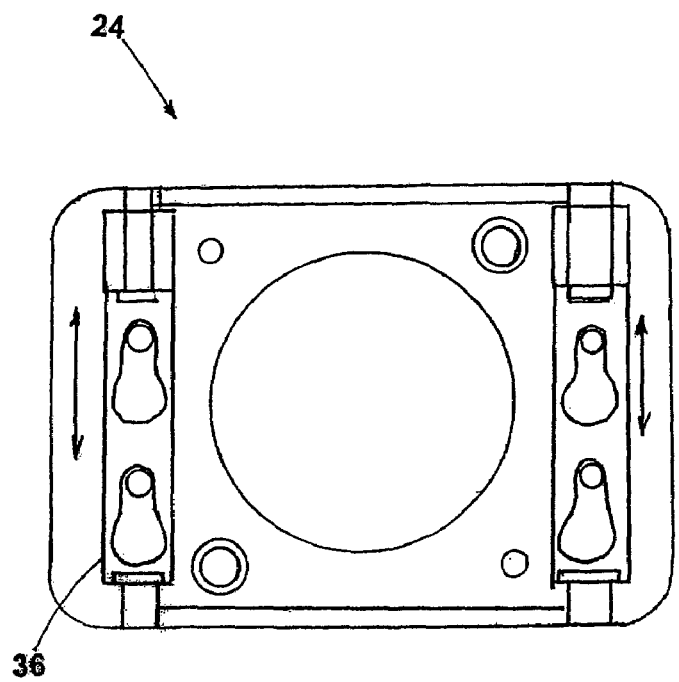
FIG. 8 is a top plan view of the lower backing plate including the two slidable retainers.
Figure 9:
FIG. 9 is a front elevation view of the lower backing plate of the invention.
Figure 10:
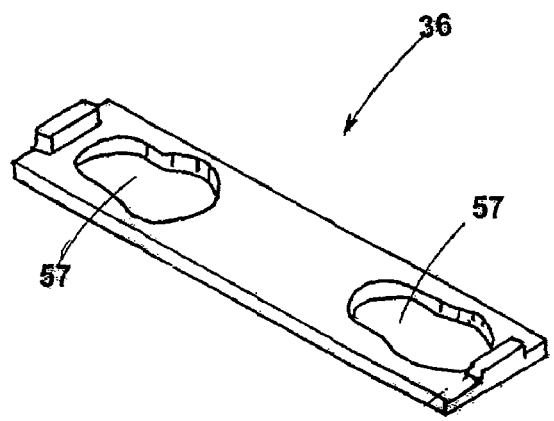
FIG. 10 is a pictorial top view of one of the retainers.

During the assembling and disassembling of the mold halves 20a and 20b, alignment pins, a diamond shaped pin and a round pin, not shown here but are described in detail in FIGS. 8 and 10 of the co-pending '787 patent application, facilitate the quick connection and disconnection of the mold halves. The mold halves are combined without any mechanical tools. When the mold halves are assembled a force is applied to the mold causing Belleville washers 45 on the top portion of clamping pins 33 to compress the prep and with the application of heat in the curing oven, the core is formed. Upon completion of the core being cured, the compressive force is released, wherein the mold is opened and the core removed. The compressive force is held in place such that a minimum force of 384 lbs is attained and held. Upon the completion of the molding process, the mold is opened by applying a vertical force on the Belleville washers and then a horizontal force is applied to slide the retainers out from the locked position. The mold is opened and the core moves along to the next process step.

The composition and method of manufacture for golf balls and golf ball cores of this invention are further directed to solid cores used in two, three or four piece golf balls. In one embodiment, the golf ball core-forming composition of the present invention comprises a blend of a first, resilient, thermoset rubber material, preferably polybutadiene, a second, reinforcing, thermoset rubber material, preferably trans-polyisoprene and a modified, non-ionic polyolefin compatible with the thermoset rubber materials, preferably a copolymer of ethylene and an alkyl acrylate. The composition comprises from about 50% to about 99%, preferably from about 60% to about 90%, and more preferably from about 70% to about 85% of the first resilient thermoset rubber material; about 1 to about 40%, preferably about 10% to about 30%, and more preferably from about 15% to about 25% of the second reinforcing thermoset rubber material; and about 0.5% to about 10%, preferably about 1% to about 5%, and more preferably, about 1.5% to about 3.5% of a compatible modified, non-ionic polyolefin.

Resilient polymers suitable for use in the golf ball core formed according to this invention include polybutadiene, polyisoprene, styrene-butadiene, styrene-propylene-diene rubber (EPDM), mixtures thereof, and the like. The resilient polymer component is preferably polyisoprene or polybutadiene ("PBD"), more preferably polybutadiene, and most preferably a 1,4-cis-polybutadiene. One example of a 1,4-cis-polybutadiene is CARIFLEX BR 1220, commercially available from H. MUEHLSTEIN & CO., INC. of Norwalk, Conn. The polybutadiene or other resilient polymer component may be produced with any suitable catalyst that results in a predominantly 1,4-cis content, and preferably with a catalyst that provides a high 1,4-cis content and a high molecular weight average. The resilient polymer component has a high molecular weight average, defined as being at least about 50,000 to 1,000,000, preferably from about 250,000 to 750,000, and more preferably from about 200,000 to 325,000. CARIFLEX BR 1220 has a molecular weight average of about 220,000. The 1,4-cis component of polybutadiene is generally the predominant portion of the resilient polymer component when polybutadiene is present. "Predominant" or "predominantly" is used herein to mean greater than 50 weight percent. The 1,4-cis component is preferably greater than about 90 weight percent, and more preferably greater than about 95 weight percent, of the polybutadiene component.

Suitable cross linking agents for use in the ball core in accordance with the invention, include one or more metallic salts of unsaturated fatty acids or monocarboxylic acids, such as zinc, calcium, or magnesium acrylate salts, and the like. Preferred acrylates include zinc acrylate, zinc diacrylate, and zinc methacrylate. Most preferably, zinc diacrylate ("ZDA") is selected as the cross linking agent. The cross linking agent must be present in an amount sufficient to cross-link the various chains of polymers in the polymer blend to themselves and to each other. The cross linking agent is generally present in the center in an amount from greater than about 10 phr to about 24 phr, preferably from about 12 phr to about 24 phr, and more preferably from about 15 phr to about 24 phr. As used herein when referring to the ball center, "phr" means parts per hundred based on the amount of the polymer blend. The desired elastic modulus for the mantle may be obtained by adjusting the amount of cross linking. This may be achieved, for example, by altering the type and amount of cross linking agent, which method is well known to those of ordinary skill in the art.

Fillers are, typically, also added to the composition used in the core, to increase the density of the core to conform to U.S.G.A. golf ball standards. Fillers may also be used to modify the weight of the core for specialty balls used by players, e.g., a lower weight core is preferred for a player having a low swing speed. Fillers typically include processing aids or compounds selected to affect mixing properties, the specific gravity, the modulus, the tear strength, reinforcement, and the like. The fillers are generally inorganic, and suitable fillers include numerous metals and metal oxides, such as zinc oxide and tin oxide, and barium sulfate, zinc sulfate, calcium carbonate, barium carbonate, clay, tungsten, tungsten carbide, an array of silicas, and the like, and mixtures thereof. The fillers, when used, are typically present in an amount from about 5 to 80 phr, preferably from about 10 to 60 phr, and more preferably from about 40 to 50 phr, of the resilient polymer component in the center. Preferred fillers for use in the core include zinc oxide and a barium component, such as barium sulfate.

A free-radical initiator is preferably included in the core. The free-radical initiator may be any compound or combination of compounds present in an amount sufficient to initiate a cross linking reaction between a cross linking agent and the reinforcing and resilient polymer components of the polymer blend. The free-radical initiator is preferably a peroxide. Suitable free-radical initiators include, for example, di(2-t-butyl-peroxyisopropyl)benzene peroxide, 1,1-bis(t-butylperoxy)-3,3,5-trimethylcyclohexane, dicumyl peroxide, di-t-butyl peroxide, 2,5-di-(t-butylperoxy)-2,5-dimethyl hexane, n-butyl-4,4-bis(t-butylperoxy)valerate on calcium silicate, lauroyl peroxide, benzoyl peroxide, t-butyl hydroperoxide, and the like, and mixtures thereof. The free-radical initiator is generally present in an amount of up to 12 phr, preferably from about 0.2 to 6 phr, and more preferably from about 0.4 to 8 phr, in the center. Suitable peroxides are well known to those of ordinary skill in the art and may be readily selected for use in the invention.

The above described resilient polymer component, cross linking agent, and free-radical initiator and optional filler, are combined to provide a golf ball core having a specific gravity from about 1.1 to 1.4, preferably from about 1.2 to 1.3, more preferably from about 1.23 to 1.27. The center of the ball may be solid, fluid-filled sphere or a wound center wherein the inner sphere is wrapped with elastic thread. The golf ball center is generally about 0.7 inches to 1.5 inches, preferably about 0.9 inches to 1.3 inches, and more preferably about 1.05 to 1.2 inches in diameter.

What is claimed is:

1. A method of molding a golf ball core, the method comprising the steps of:
   providing a continuous motion conveyor system;
   providing a single cavity top mold half and a single cavity bottom mold half, each integral with and in continual motion with the conveyor system;
   heating each mold half in a separate conveyor oven;
   providing a heated prep and placing the prep into the bottom mold half;
   assembling the mold halves together with the prep to form a single cavity mold;
   compressing the prep by utilizing spring force and retainer plates of the single cavity mold to form a spherical golf ball core;
   curing the core in a conveyor convection oven; and
   disassembling the mold and automatically removing the cured core.

2. The method according to claim 1, wherein the heating in the conveyor oven is to a temperature of 350° F.

3. The method according to claim 1, wherein the curing in the convection oven is to a temperature of about 350° F.

4. The method according to claim 1, wherein the spring force compression in each single cell cavity mold is about 384 pounds.

5. The method according to claim 1, wherein the conveyor moves at a speed of about 200 cavity molds per minute.

6. The method according to claim 1, wherein the prep is prepared by mixing a thermoset polybutadiene, a trans-polyisoprene and a modified, non-ionic polyolefin, compatible with the thermoset rubber materials.

7. The method according to claim 6, wherein the non-ionic polyolefin is a copolymer ethylene and an alkyl acrylate.

8. A method of using a single cavity mold to mold a golf ball core, the method comprising the steps of:
   providing a continuous motion conveyor system;
   providing the single cavity mold having a top mold half and a bottom mold half, each integral with and in continual motion with the conveyor system;
   heating each mold half in a separate conveyor oven;
   providing a heated prep and placing the prep into the bottom mold half;
   assembling the mold halves together to form a single cavity mold containing the prep;
   compressing the prep by utilizing spring force and retainer plates of the single cavity mold to form a spherical golf ball core;
   curing the core in a conveyor convection oven; and
   disassembling the mold and automatically removing the cured core.

9. The method according to claim 8, wherein the heating in the conveyor oven is to a temperature of 350° F.

10. The method according to claim 8, wherein the curing in the convection oven is to a temperature of about 350° F.

11. The method according to claim 8, wherein the spring force compression in each single cell cavity mold is about 384 pounds.

\* \* \* \* \*